(12) United States Patent
Giberson (10) Patent No.: US 7,237,958 B2
(45) Date of Patent: Jul. 3, 2007

(54) BEARING STIFF PLATE PEDESTAL

(76) Inventor: Melbourne F. Giberson, 30 Ludwig's Crossing La., Glenmoore, PA (US) 19343

( * ) Notice: Subject to any disclaimer, the term of this patent is extended or adjusted under 35 U.S.C. 154(b) by 40 days.

(21) Appl. No.: 11/023,187

(22) Filed: Dec. 27, 2004

(65) Prior Publication Data

US 2006/0140525 A1   Jun. 29, 2006

(51) Int. Cl.
*F16C 27/02*   (2006.01)
*F16C 23/04*   (2006.01)
(52) U.S. Cl. .................. 384/428; 384/308; 384/438
(58) Field of Classification Search ................ 384/428, 384/434, 438, 444, 247, 252–270, 303–312
See application file for complete search history.

(56) References Cited

U.S. PATENT DOCUMENTS 3,746,410 A * 7/1973 Cameron ............... 384/213
4,426,163 A * 1/1984 Schluchter et al. ......... 384/428
4,564,300 A   1/1986 Schulze
5,906,523 A * 5/1999 Thomson .................... 384/428
6,062,364 A   5/2000 Kajitani
6,712,516 B1  3/2004 Giberson

* cited by examiner

*Primary Examiner*—Thomas R. Hannon
(74) *Attorney, Agent, or Firm*—Polster, Lieder, Woodruff & Lucchesi, L.C.

(57) ABSTRACT

A bearing stiff plate pedestal with cylindrical bore and a separate bearing with shimmed saddle blocks that mate to the bore to permit accurate alignment and with self-aligning Babbitted tilting pad bearings to replace existing bearing spring plates arrangements. A method wherein the bearing stiff plate pedestal is fashioned initially as a drill fixture by drilling mounting holes in the stiff plate pedestal with the diameter of a tap drill for hold down bolts, to permit drilling and tapping holes in the pedestal base plate at proper locations. Subsequently, the mounting holes are enlarged to form clearance holes, and the stiff plate pedestal is mounted, aligned, and bolted into place.

21 Claims, 8 Drawing Sheets

| TABLE 1 - VERTICAL MOVE (IN .001") ||||||||||
|---|---|---|---|---|---|---|---|---|---|
| BRNG. | SB-1 ||| SB-2 ||| SB-3 |||
| MOVE | 1T1 | 1T2 | 1R | 2T1 | 2T2 | 2R | 3T1 | 3T2 | 3R |
| + 1 | +0.7 | -.07 | +0.7 | 0 | 0 | +1.0 | -.07 | +0.7 | +0.7 |
| + 2 | +1.4 | -1.4 | +1.4 | 0 | 0 | +2.0 | -1.4 | +1.4 | +1.4 |
| + 3 | +2.1 | -2.1 | +2.1 | 0 | 0 | +3.0 | -2.1 | +2.1 | +2.1 |
| + 5 | +3.5 | -3.5 | +3.5 | 0 | 0 | +5.0 | -3.5 | +3.5 | +3.5 |
| + 7 | +5.0 | -5.0 | +5.0 | 0 | 0 | +7.0 | -5.0 | +5.0 | +5.0 |
| + 10 | +7.0 | -7.0 | +7.0 | 0 | 0 | +10.0 | -7.0 | +7.0 | +7.0 |

SHIM MOVES ARE GIVEN TO RAISE THE BEARING.
REVERSE SIGNS TO LOWER.

FIG. 12A

| TABLE 2 - HORIZONTAL MOVE (IN .001") ||||||||||
|---|---|---|---|---|---|---|---|---|---|
| BRNG. | SB-1 ||| SB-2 ||| SB-3 |||
| MOVE | 1T1 | 1T2 | 1R | 2T1 | 2T2 | 2R | 3T1 | 3T2 | 3R |
| + 1 | -.07 | +0.7 | +0.7 | -1.0 | +1.0 | 0 | -.07 | +0.7 | -.07 |
| + 2 | -1.4 | +1.4 | +1.4 | -2.0 | +2.0 | 0 | -1.4 | +1.4 | -1.4 |
| + 3 | -2.1 | +2.1 | +2.1 | -3.0 | +3.0 | 0 | -2.1 | +2.1 | -2.1 |
| + 5 | -3.5 | +3.5 | +3.5 | -5.0 | +5.0 | 0 | -3.5 | +3.5 | -3.5 |
| + 7 | -5.0 | +5.0 | +5.0 | -7.0 | +7.0 | 0 | -5.0 | +5.0 | -5.0 |
| + 10 | -7.0 | +7.0 | +7.0 | -10.0 | +10.0 | 0 | -7.0 | +7.0 | -7.0 |

SHIM MOVES ARE GIVEN TO RAISE THE BEARING.
REVERSE SIGNS TO MOVE LEFT.

FIG. 12B

BEARING STIFF PLATE PEDESTAL

CROSS REFERENCE TO RELATED APPLICATIONS

The present invention is an improvement over the device and method of application Ser. No. 10/782,212, filed Feb. 19, 2004, a division of application Ser. No. 10/172,899, filed Jun. 17, 2002, now U.S. Pat. No. 6,712,516, hereinafter sometimes referred to as the '516 patent, the specification of which, identical to that of application Ser. No. 10/782,212, is incorporated herein by reference.

STATEMENT REGARDING FEDERALLY SPONSORED RESEARCH OR DEVELOPMENT

Not Applicable

BACKGROUND OF THE INVENTION

In recent years, there has been a concerted effort on the part of the managements of electrical generating stations to upgrade the steam turbines in many older steam turbine-generator units across the United States and elsewhere. There are two directions, generally, to pursue: (1) Upgrading the steam path components such as the vanes (buckets, blades) on the rotors and/or vanes (partitions) in the stationary components (diaphragms, blade rings) while leaving the existing rotors and shells in place, and upgrading adjacent components such as bearings, and (2) Replacing the existing rotors and shells with upgraded rotors and shells, and replacing adjacent components such as bearings with upgraded bearings. In almost all situations, these upgraded designs result from the use and application of advanced technology that is dependent upon the use of digital computers that were not available when the original steam turbines were designed and built.

A major objective is to maintain tight seal clearances in the steam path in order to improve the steam path efficiency. This requires low amplitude rotor vibrations, which can only result from optimized rotor-bearing dynamics for the turbine rotor and bearings.

Since the beginning of the turbine-generator industry, there has been significant pressure to improve the rotor vibration measuring instrumentation and to improve the calculation capabilities for predicting the vibratory characteristics of the rotors in rotor-bearing systems. In the 1940s and 1950s, the instrumentation was rudimentary at best. For rotor-dynamics and film bearing design, the fundamental equations were known, but only the simplest of equations could be solved with the "closed form" analytical methods. With the introduction of digital computers, rotor-dynamics and film bearing designs for systems other than the simplest could be calculated. As the digital computer technology advanced, larger and more complex rotor-bearing-foundation models could be modeled. The results of computer simulations demonstrate the importance of controlling the stiffness of foundations for film bearings for various steam turbine rotors. At the same time, the introduction of solid-state electronics, and then later, the introduction of computer-based instrumentation and diagnostics provided great advances in the ability to monitor, diagnose, and record vibrations of turbine rotors under a wide range of operating conditions.

The results of almost all of the rotor-dynamic studies of a class of large steam turbine rotors known as "high-pressure steam turbine" rotors clearly show that very stiff pedestals for the oil-film bearings that support these rotors is highly advantageous for minimizing the vibratory amplitudes of the rotors relative to the turbine shells. The vibratory instrumentation and equipment for monitoring, diagnosing, and recording the vibrations of these rotors confirms these results. Because there is great value in optimizing the efficiency, availability, and reliability of these steam turbines and their associated generators, there is considerable justification to improve the design of components when and where possible.

This invention has particular application to the replacement of flexible bearing supports of a type used in Westinghouse Electric Company steam turbines from the late 1940s to the mid 1960s, but its utility is not confined thereto.

These original bearing and support arrangements were simple, comprising a yoke, a bearing mounted in a yoke, a bearing cap to retain the bearing in the yoke, and two flexible I-beams to support a yoke. In this type of steam turbine, the bearing design is typically steel backed, Babbitt lined, oil film lubricated, and not of rolling element design. To change the alignment of the rotors it is necessary to change the position of the bearings supporting the rotors. Shims are used between the yoke and pedestals to adjust the vertical height of the yokes and bearings, and jack screws or shims are used to adjust the horizontal positions of the yokes, and hence, of the bearings. This design is discussed in considerable detail in my U.S. Pat. No. 6,712,516.

In the original arrangement, when a turbine rotor with a total weight on the order of 30,000 lbs (133,440 Newtons) is placed in two bearings of this design, the vertical displacement downward of each bearing is approximately 0.003 to 0.005 inches (0.229-0.635 millimeters). This provides a vertical stiffness of the bearing and flexible support on the order of between 5 million lbs/inch (15,000 lbs/0.003 inches) and 3 million lbs/inch. On the other hand, a vertical stiffness of the bearing support of at least 15 million lbs/inch is required to obtain superior rotor-dynamic characteristics, and even higher vertical stiffnesses of the support structures for the film bearings are preferred.

One object of this invention is to provide a method to replace an existing yoke and mating flexible supports having low stiffness, on the order of 5 million lbs/in with a substantially stiffer pedestal having a desired stiffness of at least about 15 million lbs/in, hereinafter stiff plate.

Another object of this invention is to provide improved means for aligning the bearing and rotor.

Other objects will occur to those skilled in the art in light of the following description and accompanying drawings.

It should be noted that from the perspective of improved rotor-dynamics, another class of bearing support pedestals exists that is superior to the original spring plate pedestals that are being replaced by the stiff pedestal of this invention. This other class of bearing support pedestals uses heavy steel plates welded into, and therefore, integral with, the outer pedestal housings. It has been used by all manufacturers of turbines for at least as long as the spring plate pedestal has been used, and is satisfactory for providing adequate stiffness for the oil film bearings used. Upgraded pedestals using the stiff pedestal design and methods of this invention are comparable in stiffness to this other class of bearing pedestals that were welded into and integral with the outer pedestal housings.

BRIEF SUMMARY OF THE INVENTION

In accordance with this invention, generally stated, the original bearing, yoke and two spring plate pedestals are removed from the base of the outer pedestal housing, and are replaced by stiff plate pedestals and new bearings, with each stiff plate pedestal being made from a single heavy plate of steel with a semi-cylindrical bore or saddle and with two mounting feet machined into the plate, such that the mounting feet seat onto the base of the outer pedestal housing in approximately the same locations from which the original spring plate pedestals were removed. The removal of the original spring plate pedestal can be the result of breakage of the plate, as described in patent '516, or by burning or machining off the original spring plate. The replacement can be accomplished as described in that patent or in an analogous method here described, or by removal of a flexible plate of patent '516. The new bearing comprises (a) a lower half bearing housing, with shimmed saddle blocks that have a cylindrical outer surface, that mates to the cylindrical bore, or saddle, of the new pedestal, (b) an upper half bearing housing with ears having gaps between the ears and the top surface of the new stiff pedestal, (c) shims that almost fill these gaps, (d) bolts to hold down the ears and shims to the stiff pedestal, (e) Babbitted tilting pads to form a bearing to mate to a journal of the rotor, the Babbitted pads each having a self-alignment feature to permit the journal to maintain alignment in the form of tilting and twisting to the journal at all times, including during rotor vibrations and during thermal changes of diameter. The shims associated with each saddle block and the gaps between the ears and the pedestal permit precise alignment of the bearing and rotor as required by the rotor and turbine shell assembly.

If the original spring plate pedestals were welded into the base of the pedestal outer housing, these are cut away, and, in the preferred embodiment, new mounting surfaces are machined onto the base of the pedestal surrounding the original spring plate pedestals. A bolt pattern is drilled through the mounting feet of the new heavy plate pedestal. During installation, the stiff plate pedestal is aligned to its approximate final vertical, horizontal, twist and tilt positions by any one of several methods, with the bottom surfaces of the stiff plate pedestal plate being machined to establish proper elevation and tilt of the saddle bore relative to the anticipated journal position and orientation, and then holes are transferred to the base of the outer pedestal housing, the bolt pattern in the mounting feet serving as a template or drill fixture, the new pedestal plate is removed, the bolt holes are drilled and tapped, the work area is cleaned up, the new pedestal is aligned with precision, and it is assembled and bolted into place.

In the method of replacing a welded bearing flexible support plate with a stiff plate pedestal, there are three preferred methods, all counterparts to the three methods set out in patent '516. In the first, after removing the bulk of each vertical flexible plate, any part of the flexible plate protruding from the base plate of the outer pedestal housing is machined, as by milling or grinding off with a portable milling machine or grinder, both methods being encompassed by the term "machined" as used herein, and that part and the top surface of the base plate surrounding it are machined so that they are flat, and this top surface of the base plate now becomes the mating surface to the replacement stiff bearing support plate. It is preferred that the two mating surfaces machined into the base plate be machined in the same plane, but this is not required as the two mating surfaces of the bottom of the new stiff pedestal can be machined individually as required to set properly onto the mating surfaces of the base plate. In certain cases, it may be possible to machine one continuous mating surface into the base plate.

The new stiff plate pedestal with mounting holes already drilled, is positioned over the exposed surface of the pedestal base in precisely the position to be assumed in final assembly, holes are drilled in the pedestal base in conformance with the hole pattern in the heavy plate pedestal, and tapped. A common method of making the holes in the new stiff plate pedestal for use as a drill fixture is to make the diameters of the holes to be the diameters of the tap drills to be used to make the holes in the base plate of the outer housing, and not the diameters of the clearance holes that will be used during final installation. If epoxy is used to help secure the bottom surfaces of the stiff plate pedestal to the pedestal base and to fill any voids that might be found between the mating surfaces block, it is applied just before the stiff plate pedestal is assembled to the base plate. Then the stiff plate pedestal is installed, and then the hold-down bolts are installed and torqued.

In a second method, any remaining portions of the flexible plates are machined down so that they protrude a short distance, as, for example, approximately ¼ inch, but are not completely eliminated. The surface areas around the protruding flexible plates are machined flat, preferably leaving a narrow strip, for example, about 1/16th of an inch per side, of unmachined surface around the protruding flexible plate stub or stubs, contiguous the protruding flex plate stub. A groove sufficiently deep to accommodate the protruding flexible plate stub, and wide enough to bridge the distance beyond the inner edges of the machined strips is machined into the bottom surface of the stiff plate pedestal. Epoxy can be used to form a permanent chock in the gaps around the remains of the protruding flexible plates, and any other gaps between the bottom surfaces of each of the mating surfaces of the stiff plate pedestal and the tops of the mating sections of the base plate of the outer pedestal housing. The method of using the stiff plate pedestal as a drill fixture as described in the first method above is common to all the methods in the preferred embodiments.

The third method is to grind the broken and protruding remains of the original flexible plates and to leave them protruding for a short distance, as, for example, ¼ of an inch, and not to machine flat the mating surfaces of the base plate. The stiff plate pedestal, with grooves in the bottom surface, is used as in the prior two methods, but the two bottom mating surfaces of the stiff plate pedestal are not expected to sit flatly on the top surfaces of the pedestal base plate. The stiff plate pedestal is supported by a block, shim, small jack screws or otherwise so that it remains located and oriented properly throughout the installation process. The stiff plate pedestal is used as a drill fixture as in the other two cases to locate and drill the hold-down bolt holes. In this case, epoxy is used to form a permanent chock in the gaps around the remains of the protruding flex plates and other gaps between the bottom of the stiff plate pedestal and the top of the mating sections of the pedestal base plate. Once the stiff plate pedestal is bolted in place and the epoxy is suitably cured, then the assembly of the bearing and turbine rotor can proceed.

In any of the above methods for installing the stiff plate pedestal, it is essential to align the cylindrical bore, or saddle, of the stiff plate pedestal so that is approximately concentric with the anticipated orientation of the respective journal of the turbine rotor when the rotor is installed. This means that the centerline of the saddle bore of the stiff plate pedestal must be in the approximate horizontal and vertical position, and the centerline of the saddle bore must have the proper twist (angle in the horizontal plane) and tilt (angle in the vertical plane).

An alternative method to adjust the stiff plate pedestal alignment is to use one or more shim plates, from a few thousandths thick to one inch (25 mm) thick between the stiff pedestal plate and the mating base plate. The final alignment results will be the same, although it is usually easier to handle and to adjust the thickness and taper of the shim plate.

While other methods of alignment may be used, three common methods of alignment of the stiff plate pedestal are identified here: In the first method, a stub shaft with precision machined journal and mounting surfaces is mounted onto the end of the adjacent turbine rotor coupling hub, so as to duplicate approximately where the journal for the bearing that is being replaced will be located when the removed turbine shaft is repositioned. Micrometers are used to measure the position of the saddle bore to the journal surface of the stub shaft, for example, on the left side, right side, and bottom, and at both ends, for a total of six readings. When aligned, the stiff plate pedestal will be in almost the identical position to that which will be required when the removed turbine rotor is installed. This process can be used during the process of drilling and tapping the hold down bolt holes, and when the pedestal is being aligned for final installation.

It should be noted that it may be possible that a new turbine rotor having similar journal locations may be used instead of a turbine rotor that was in service previously and was removed prior to the installation of the new stiff plate pedestal and bearing assembly of this invention, and that this new turbine rotor may also be referred to as a "removed" turbine rotor.

In the second alignment method, a conventional tight-wire technique is used. Micrometers are used to locate and orient the saddle of the heavy pedestal plate to the desired approximate final position.

In the third alignment method, conventional laser alignment techniques are used.

It is not significant as to which alignment process is used. It is important that an alignment process be used and that it be done correctly. The result of any one of these methods performed correctly will be the same as the result of any other, within an acceptable tolerance.

After alignment and installation according to the above methods, the stiff plate pedestal is ready for the bearing and removed turbine rotor to be installed.

DETAILED DESCRIPTION OF A PREFERRED EMBODIMENT

Figures 1, 2:
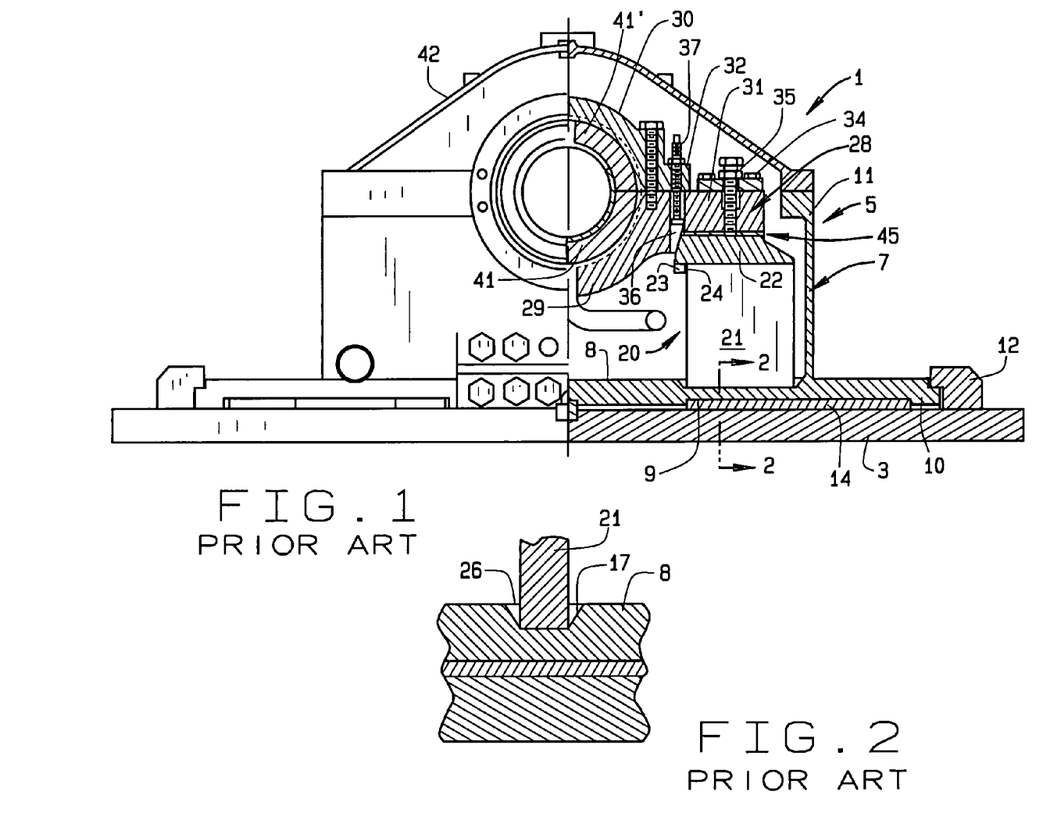
FIG. 1 is a view in front elevation, partly in section, of a prior art flexible plate bearing support (FIG. 1 of U.S. Pat. No. 6,712,516)
FIG. 2 is a sectional view taken along the line 2-2 of FIG. 1.

Referring now to FIG. 1 for a prior art bearing pedestal assembly, except as indicated, the various elements, except for the bearing stiff plate assembly, are identical in the prior art device and in the present device, the present invention lying in the replacement bearing stiff plate pedestal for the flexible plate assembly. The bearing pedestal assembly 1 includes a sole plate 3 mounted on a foundation, not here shown, a an outer bearing pedestal 5, an outer bearing pedestal cover 42, a yoke 28 with a lower bearing cradle 29 and an upper bearing housing 30, a turbine shaft bearing comprising a lower bearing half 41 and an upper bearing half 41'.

Figure 6:
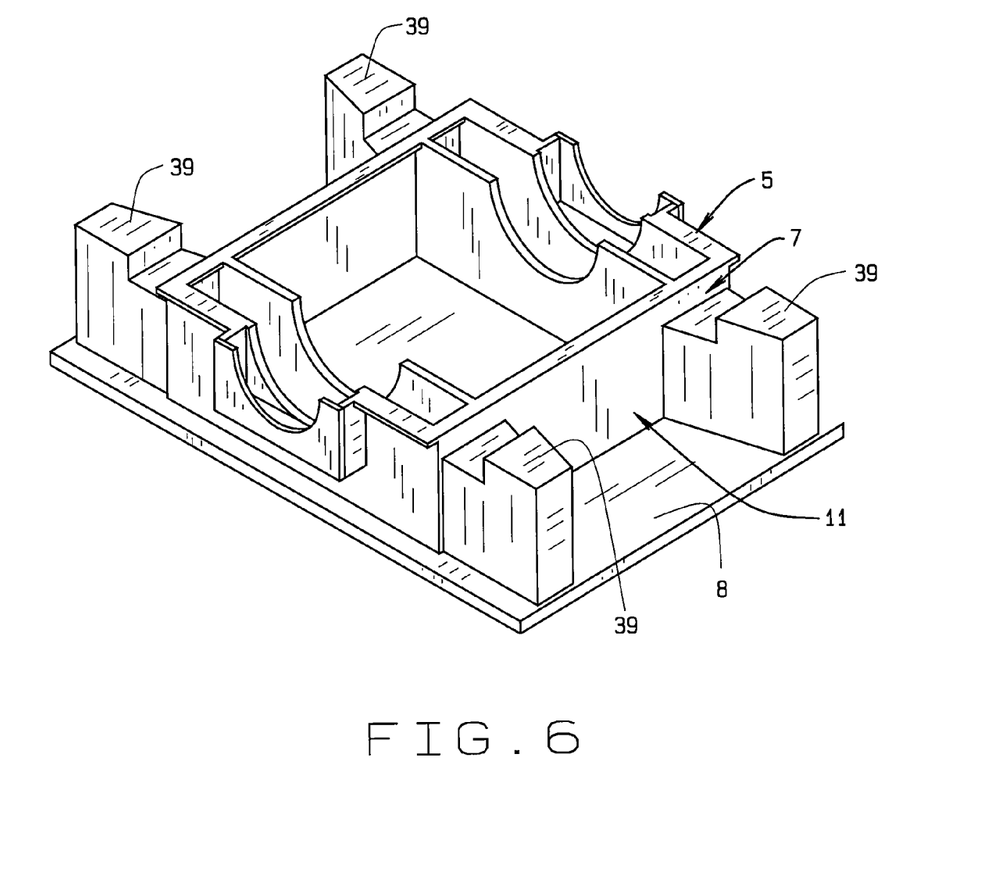
FIG. 6 is a view in perspective of an existing outer pedestal housing, lower half, into which the stiff plate pedestals of FIG. 3 and bearing assemblies of FIG. 4 are to be installed.
Figure 7:
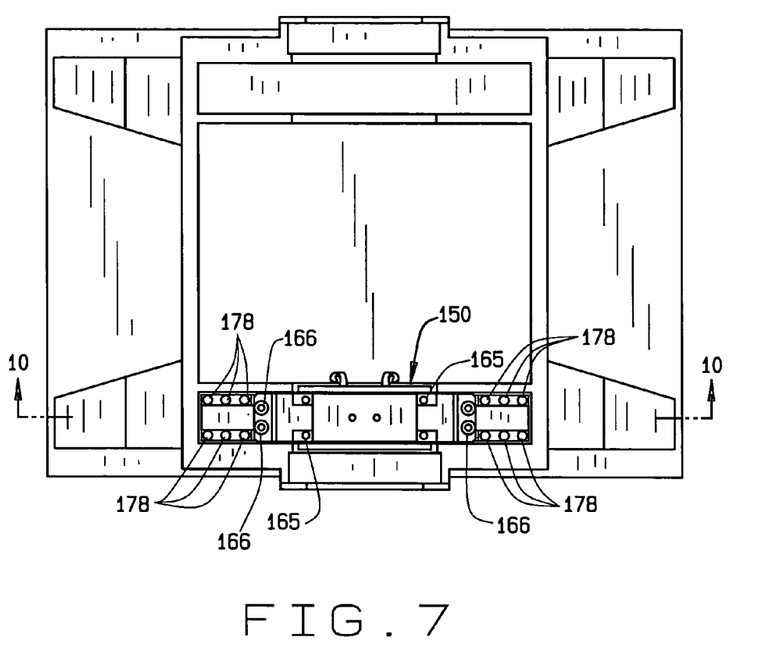
FIG. 7 is a top plan view of the assembly of the stiff plate pedestal of FIG. 3 and one of the bearing assemblies of FIG. 4 in the existing outer pedestal housing of FIG. 6.
Figure 8:
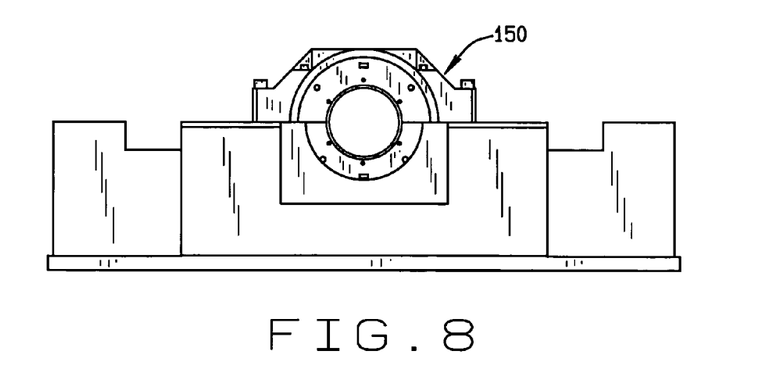
FIG. 8 is a view in end elevation of FIG. 7.

An outer bearing Pedestal 5 has a pedestal base 7, a pedestal base floor plate 8, in a lower surface of which is a channel 9, a bearing plate 14, mounted fixedly in the channel 9, a pedestal base floor plate flange 10 at each end of the base floor plate, a pedestal base side wall 11, and side gibs 12, extending over the flange 10 with enough clearance in this embodiment to permit the pedestal assembly, including the bearing plate 14, to slide on sole plate 3 parallel to the axis of a turbine shaft. As shown in FIG. 6, the pedestal and base 7 has a pedestal base floor plate 8, and also has heavy palms 39 outboard of the side wall 11, which support horns of the turbine shells. The construction and operation of the bearing stiff plate of this invention is, however, independent of whether or not the pedestal assembly is movable or fixed.

In the prior art device illustrated in FIG. 1, yoke 28 has arms 31 through which bolts 34 extend into a top block 22 of a flexible plate assembly 20 through holes in a shim pack 45 that embraces a jack screw 35. The yoke can be moved a short distance transversely by a screw 37 extending through a threaded hole in arm 32 of upper bearing housing 30, through a hole in arm 31 of yoke 28 into a wedge 36 between top block 22 of the flexible plate assembly 20 and an edge of the hole through the arm 31. There are two wedge assemblies in a yoke, symmetric with respect to the shaft centerline, to be able to move the yoke and attached bearing assembly to the left or right to achieve a desired rotor and bearing alignment, and to retain the alignment once set. Several variations of the wedge arrangement for aligning rotors and bearings have been used over the years, any of which wedge arrangements may be used.

The prior art flexible plate assembly 20 includes, besides the top block 22, a flexible plate or blade 21. In the prior art device, a top edge of the plate 21 extends into a channel 23 in the underside of the top plate 22, where it is welded with a weld 24, and a bottom edge extends into a channel 17 in the upper surface of the pedestal base floor plate 8 where it is secured by a weld 26 as shown in detail in FIG. 2. As has been indicated in the discussion of U.S. Pat. No. 6,712,516, this construction ultimately often leads to breakage of the flex plate 21 at the weld 26 or a short distance above the weld 26.

The present invention replaces the entire bearing, yoke, and flexible plates of FIGS. 1 and 2 with the stiff plate and bearing assembly shown in the embodiments of FIGS. 3-12 of the present application.

Referring now to FIGS. 3-12, reference numeral 150 indicates a stiff plate assembly supporting a bearing assembly 140 of a high pressure turbine shaft.

In this embodiment of stiff bearing plate assembly 150, an assembly 150 has a stiff bearing plate 153 made in one piece, from any one of several alternative materials: for example, a single continuous forging of alloy steel comparable to AISI 4340 or 4140 (carbon alloy steels known for excellent endurance characteristics); or a single continuous plate of alloy steel such as AISI 4340 or 4140; or a carbon steel plate of A516, or A-36 carbon steel. The selection of material may depend on other criteria, because any of these steels will provide approximately the same stiffness.

Figure 3:
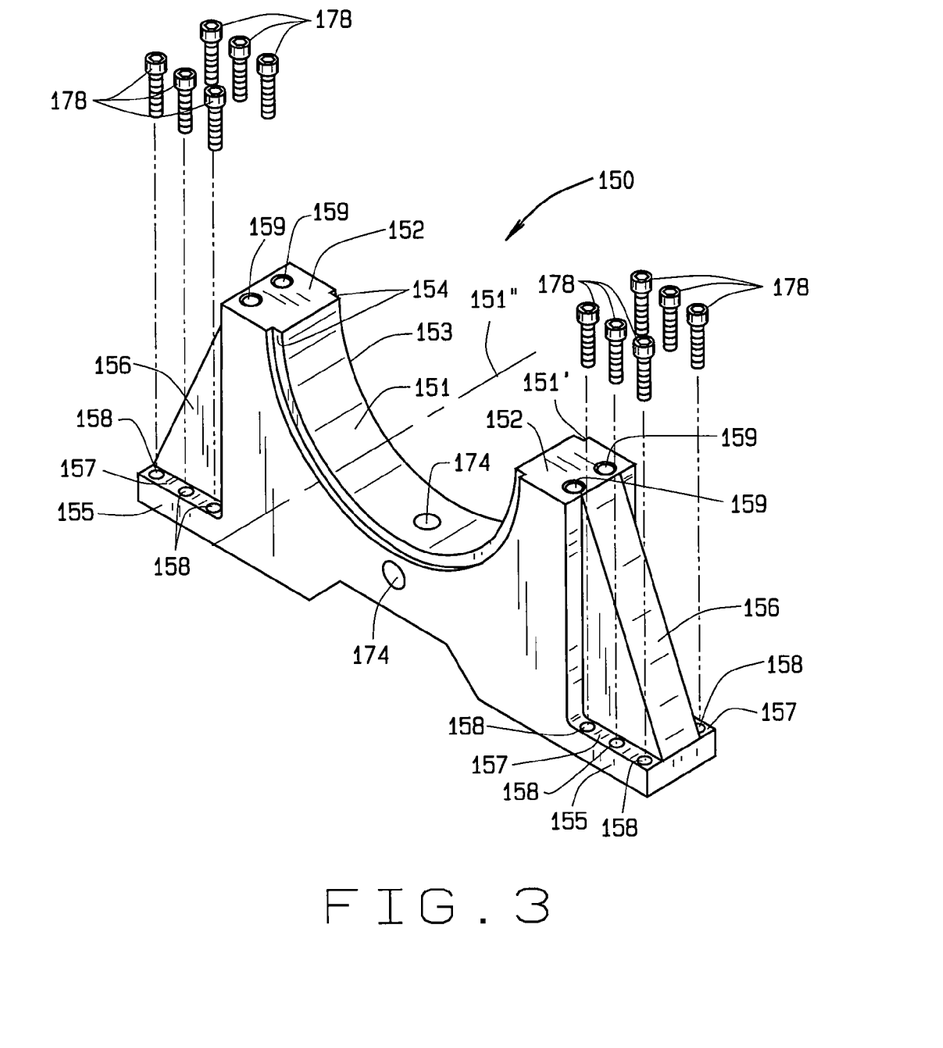
FIG. 3 is a view in perspective of one embodiment of stiff plate pedestal of this invention.

As shown particularly in FIG. 3, the plate 153, generally on the order of six to eight inches thick and typically about five and a half feet wide at its base and two and a half feet tall, has an inner surface shaped as a half-cylinder, known in the industry as a saddle, 151 and two mounting feet 155 machined into the plate, such that the mounting feet seat onto the base plate of the outer pedestal housing in approximately the same locations from which the original spring plate pedestals were removed, and gussets or buttresses 156. The mounting feet 155 are separated by a shallow bridging section, provided as a matter of convenience; it is easier to machine flat to the tolerances required two short surfaces of the undersides of the feet and two short spans of the upper surface of the base plate than to machine flat a long span, and, in the case of a projecting stub of a removed plate, to mill or grind two short spans of a broken stub. Ledges 157, on either side of the gussets, accommodate bolt clearance holes 158. Threaded bolt holes 159 open through flat upper faces 152 of the plate 153 on either side of the half-cylindrical bore 151. The faces 152 are generally in a plane parallel to the bottom surface of mounting feet 155 and contain central axis 151", each face extending in a plane generally radially outward from the bore. In certain cases, the bottom mounting surface is one plane without a bridging section, the choice of one continuous or two separate surfaces depending upon the specific circumstances of the application. The central axis 151" of the half 151" cylinder is generally aligned with the axis of the journal of a turbine rotor to be supported.

Figure 4:
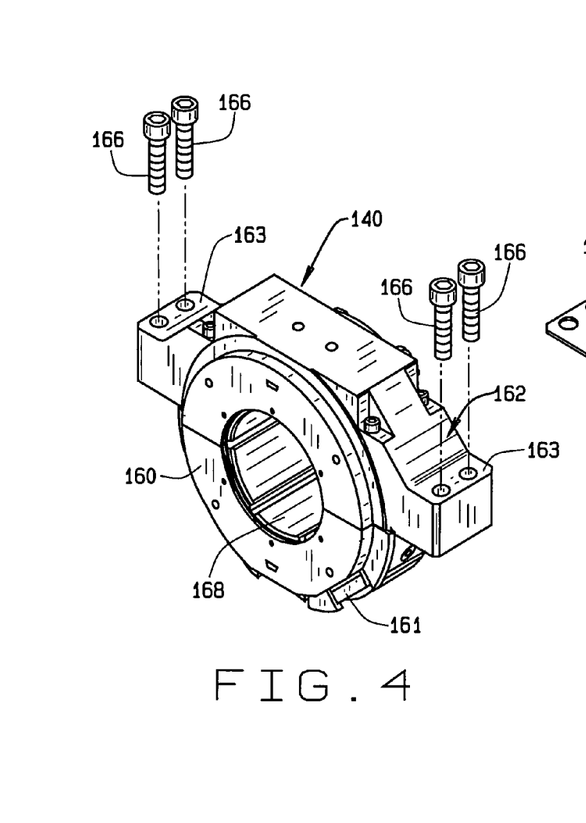
FIG. 4 is a view in perspective of a bearing assembly used with the stiff plate pedestal of FIG. 3.
Figure 5:
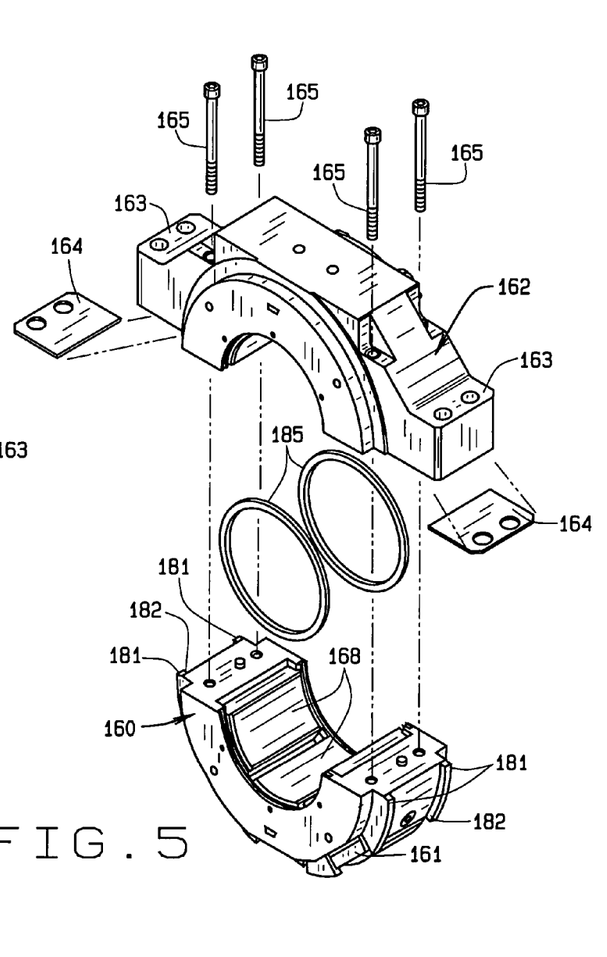
FIG. 5 is an exploded view in perspective of the bearing assembly of FIG. 4.
Figure 10:
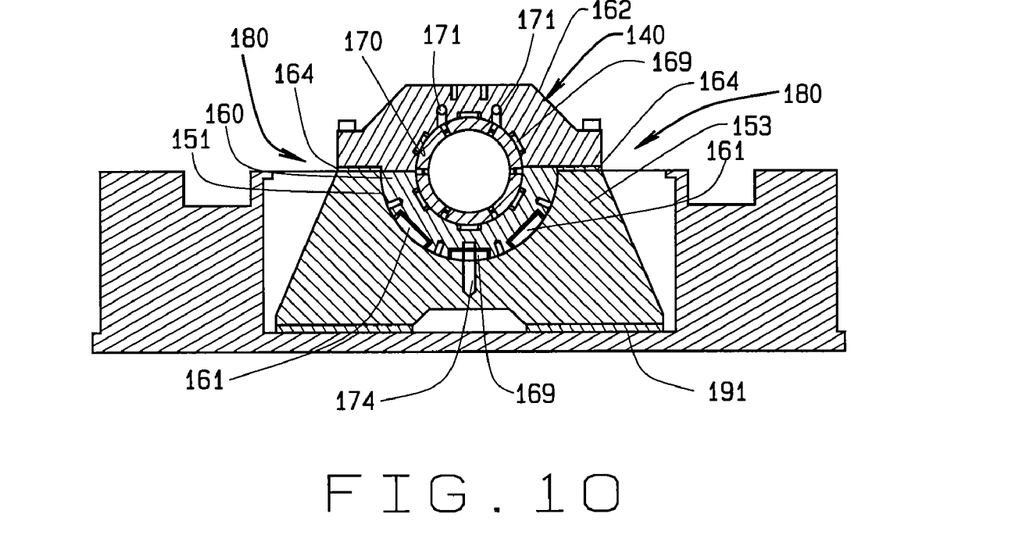
FIG. 10 is a sectional view taken along the line 10-10 of FIG. 7.
Figure 11:
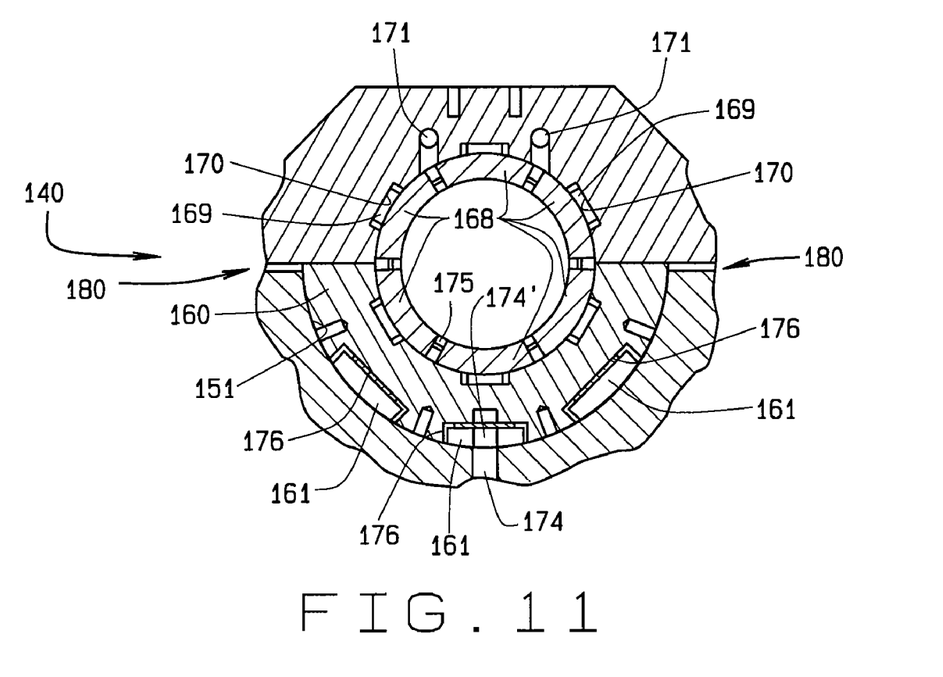
FIG. 11 is an enlarged fragmentary sectional view of the bearing assembly shown in FIG. 10.

As shown particularly in FIGS. 4, 5 and 10, the new bearing assembly comprises (a) a lower half bearing housing 160, with shimmed saddle blocks 161 that have a cylindrically arc shaped outer surface that mates to the half-cylindrically arc shaped bore 151 of the new pedestal, (b) an upper half bearing housing 162 with ears 163 with gaps 180 between the ears and top surfaces 152 of the new stiff pedestal, (c) shims 164 that almost fill these gaps 180, (d) bearing bolts 165 to hold the two halves together, (e) bolts 166 to hold down the ears and shims to the stiff pedestal, and (f) Babbitted tilting pads 168 to form a bearing to mate to a journal of the rotor. The Babbitted pads have a self-alignment feature to permit the journal to maintain alignment in the form of tilting and twisting to the journal at all times, including during rotor vibrations and during thermal changes of diameter. To that end, each tilting pad has a stem 169 fitting loosely into a seat 170 in the bearing housings. The bottom surfaces of the ears 163 are spaced from the top surfaces 152 of the pedestal, on the order of 0.1250 inches (3.175 mm) so as to permit thick shim plates 164 to be ground to size, perhaps tapered, to provide a space on the order of 0.002 inches (0.00508 mm)) between the lower surface of the ears 163 and the shims 164 before the bearing is tightened on to the pedestal 153.

The lower half bearing housing 160 has two flanges 181, FIG. 5, that extend radially outwardly approximately ¾ inch (18.05 mm) beyond the half-cylindrical arc bore, or saddle 151, FIG. 3. The half-cylindrical arc bore 151' is larger than the half-cylindrical arc bore 151 by 1 inch (25.4 mm) radially. The axial gap between the inside surface 182 of the flanges 181 is larger than the distance between the faces 154 of the stiff pedestal 153 by 0.003 inch (0.007.62 mm) to 0.010 inch (0.0254 mm), depending upon the application.

The lower half bearing housing 160 has axial slots in which the shimmed saddle blocks 161 (designated as SB-1, SB-2 and SB-3 in FIG. 12), are mounted. As has been indicated, the shimmed saddle blocks have a radially outer cylindrical arc surface formed on substantially the same radius as the half-cylindrical arc shaped bore 151, and a planar inner surface, against which shims 176, (designated as 1T1, 1T2 and IR, 2T1, 2T2 and 2R, and 3T1, 3T2 and 3R in FIG. 12), lie. The selection of the shims 176 (1T1 etc.) and the shimmed gaps between the ears and the pedestal permit precise alignment of the bearing and rotor as required by the rotor and turbine shell assembly. Exemplary shimming arrangements are set out in the table in FIG. 12.

A lube oil supply port 174 is machined into the stiff plate pedestal 153, located so as to be aligned with a saddle block 161, in this case, the bottom saddle block. A mating lube oil supply port 174' arrangement is provided in the bearing and mating saddle block 161, permitting lube oil to be supplied to the cavity 175.

The upper half bearing housing 162 has in it lubrication oil drain passageways 171 communicating at one end with cavity 175 containing the bearing tilt pads 168 and at another end with an oil fitting 172. Floating seal rings 185, split to facilitate assembly, minimize lube oil flow out of the cavity 175 along the journal.

It is to be noted that in the present embodiment, the jack screw 25, screw 37 and wedge 36 of the prior art device of FIG. 1 are eliminated.

Figure 9:
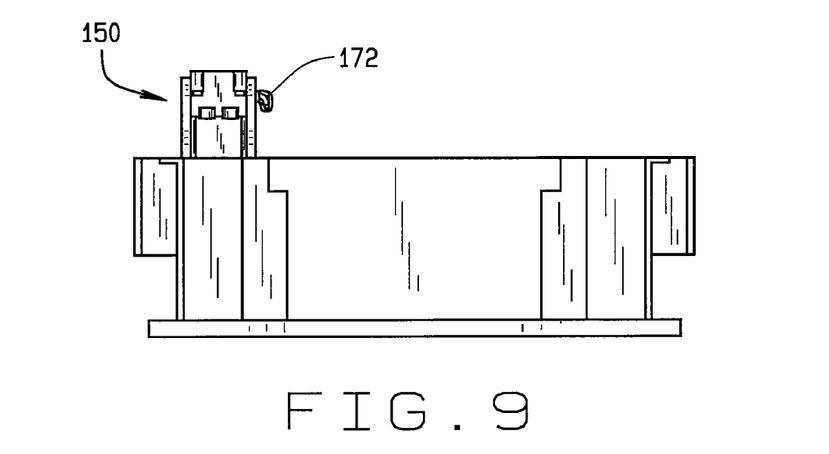
FIG. 9 is a view in side elevation of FIG. 7.

In FIG. 9, the plate is shown in a condition comparable to that of the left-hand plate of FIG. 8 of patent '516, where a lower surface 63 of the bottom block 60 is uninterruptedly smooth, and a stub 64 of a broken plate 20 is ground flush with a top surface of the floor plate 8, which is machined flat, if it is not already flat, so that the bottom block 60 rests flat against a flat surface.

A second approach is made when the stub of a removed plate is permitted to extend a short distance above the base plate through the spans of the under surfaces of the feet. The broken plate stub is machined to a distance, for example ¼ inch, above the upper surface of the pedestal base floor plate 8, and the upper surface of the floor plate 8 is machined smooth to within a short distance, for example ¹⁄₁₆ of an inch, of the stub. As shown on the left side of FIG. 8 of patent '516, a channel is machined in the under surfaces of the feet to accommodate the stub. The channel is wide enough to span the stub and the unmachined area immediately adjacent the stub, and deep enough to clear the stub.

In a third embodiment, not illustrated, because it will look like the second embodiment, the area of the lower surface of the floor plate 8 is not machined, and the stub 77 is merely machined until its highest point is the desired height, for example ¼ inch. The stiff plate pedestal, with grooves in the bottom surface, is used as in the prior two methods, but the two bottom mating surfaces of the stiff plate pedestal are not expected to sit flatly on the top surfaces of the pedestal base plate. The stiff plate pedestal is supported by a block, shim, small jack screws or otherwise so that it remains located and oriented properly throughout the installation process. The stiff plate pedestal is used as a drill fixture as in the other two cases to locate and drill the hold-down bolt holes. In this case, epoxy is used to form a permanent chock in the gaps around the remains of the protruding flex plates and other gaps between the bottom of the stiff plate pedestal and the top of the mating sections of the pedestal base plate. Once the stiff plate pedestal is bolted in place and the epoxy is suitably cured, then the assembly of the bearing and turbine rotor can proceed.

In any of the stiff plate embodiments, the stiff plate mounting feet 157, drilled in the desired pattern, serve the same function as drill fixture 85 of patent '516, as a template for holes in the floor plate. Holes in the floor plate 8 are drilled, through the template (clearance) holes 158, and tapped. In the floor plate of the sliding assembly, the tapped holes in the floor plate are generally less than two inches deep, depending upon the thickness of the floor plate, usually about three inches, but deep enough to insure that the block is fixed to the floor plate. The holes in the floor plate cannot extend through the floor plate, because a bolt, protruding from them, would interfere with the movement of the assembly. Certain base plates are on the order of six inches thick, and in that case, the tapped holes will be four to five inches deep.

In installing the assembly of the first embodiment, when a welded flex plate is broken, the affected turbine rotor is removed from the turbine. The old pedestal equipment is removed, leaving the broken surface of the flexible support plate exposed. If only one of the flex plates of the pair is broken, it is preferable that the other of the pair be cut off, so that both plates are replaced, providing similar stiffness characteristics. A portable milling machine can be mounted on the pedestal and used to machine the top surface of the pedestal base and a protruding flex plate so that the entire area is flat. The stiff plate pedestal can then be placed on the mating surfaces of the pedestal base (or floor plate).

The assembly bolt holes are then drilled, using the mounting holes in the stiff plate pedestal as templates, the plate is removed and the holes in the floor plate tapped. The stiff support plate is then set in place. A stub shaft with a hub, as shown in FIGS. 13 and 14 of patent '516, is bolted to the end of the other turbine rotor coupling so as to duplicate approximately where the journal for the bearing will be located when the removed turbine shaft is reinstalled.

With the stub shaft in place, micrometers can be used to measure the distances between the bore of the stiff plate pedestal and stub shaft to determine how much the pedestal plate must be moved left or right, and up or down. The stub shaft and pedestal plate are removed, the bottom surface of the pedestal plate is machined or a shim plate or plates 191 machined, or both, to achieve the proper elevation. Then the shim plate(s), pedestal plate and stub shaft are installed, the pedestal plate is adjusted left or right as required, and hold down bolts 178 are installed and tightened.

If it is desired to install the pedestal with epoxy to act as a chock in any gap, however small, or to secure the stiff plate pedestal to the pedestal base (or floor plate), this can be done at the time the bolts 178 are finally installed.

In any of the embodiments, the bolts are torqued to a prescribed torque value to close the gap occupied by the shim plates.

When epoxy is employed, after the epoxy is hardened, the bearing lower half can be installed. Bearing pedestal and bearing are now ready for installing the turbine rotor.

In preparing the top surface of the base for the second embodiment, the remaining flex plates are ground down so that they protrude approximately ¼ inch but are not completely eliminated. The surfaces around the protruding flex plate stubs are machined flat, but leaving approximately ¹⁄₁₆ inch per side around the protruding flex plate, or an unmachined band approximately ⅞ inch wide over each of the plates. The groove in the bottom surface of the stiff pedestal is approximately 1 inch wide and of sufficient depth to clear the stubs so that when installed, the new stiff pedestal bridges the protruding remains of the original flex plate and the unmachined area on either side of the stub. The remainder of the installation is as described with respect to the first embodiment. In the case of the second method, epoxy may be used to form a permanent chock in the gaps around the remains of the protruding flex plates, and in any other gaps between the bottom surface of the stiff pedestal and the tops of the mating sections of the pedestal base (or floor plate).

In preparing for the third embodiment, the broken and protruding remains of the original flex plates are again ground to a height of approximately ¼ inch, but the base plate or floor plate is left as is. This may be all that can be done in some situations. Then, either a separate drill fixture with holes representing the hole pattern in the stiff plate pedestal or the stiff plate pedestal; itself, with grooves in the bottom surface, is installed as in the prior two embodiments, but the drill fixture (or stiff pedestal) is not expected to sit flatly on the top surfaces of the pedestal base. The drill fixture (or stiff pedestal) is fastened with a block or shim or otherwise so that it remains properly located with adequate rigidity to function properly. The drill fixture (or stiff pedestal) is then used as in the other two embodiments to locate and drill the hold down holes. Shims or small-jack bolts are expected to be required to level the stiff plate pedestal into position. In this case, epoxy is used to form a permanent chock in the gaps around the remains of protruding flex plates and other gaps between the bottom of the pedestal plate and the top of the mating surface of the pedestal base. Once the stiff pedestal plate is properly bolted in place and the epoxy is suitably cured, the assembly of the remaining bearing support structure, bearing and turbine rotor is as first described above.

As is apparent from the description, broadly speaking in the present application and patent '516, three embodiments of method of replacing a broken or cut off flex plate are described. In the first, the projecting plate stub is machined flat with the surrounding surface of the floor plate to provide a smooth, flat surface, a template, either in the form of template plates 86 for the replacement stiff plate pedestal, or patterned holes in feet 155 of the replacement stiff plate pedestal 153, is used to locate the position of holes in the floor plate to be tapped to receive hold-down bolts. In the second, the projecting stub is machined to project a short distance, for example, ¼", and a bridging channel is formed in the lower surfaces of the template, to accept the stub, and that part of the surface of the floor plate to be engaged by the template is machined smooth. In the third, the stub is again machined until it projects a short distance, and a bridging channel is formed in the lower surfaces of the template but the surrounding surface of the floor plate is not machined flat. Epoxy is relied upon to provide a bond between the replacement bearing-supporting plate and the floor plate.

Preferably the stiff plate pedestal is made from carbon steel plate or from forged alloy steel, heat treated and stress relieved. The stiff plate pedestal can also be made from cast carbon steel.

Numerous variations in the construction of the device of this invention and the method of its installation, within the scope of the appended claims, will occur to those skilled in the art in light of the foregoing disclosure. Merely by way of example, different materials from carbon steel can be used, as long as they exhibit the proper characteristics of high compressive and tensile strength, essentially no distortion under the loads anticipated, and durability.

Figure 12:
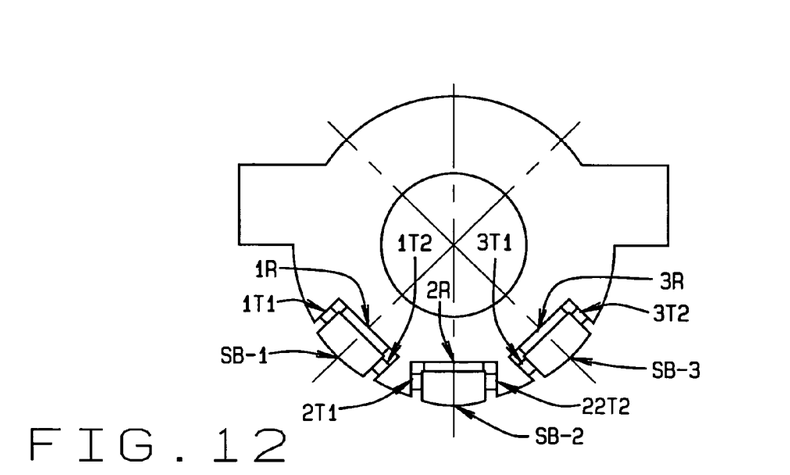
FIG. 12 is a somewhat diagrammatic view of the bearing assembly of FIGS. 6-11, illustrating the use of shims to position the bearing assembly in the bore of the pedestal.
Figure 12A:
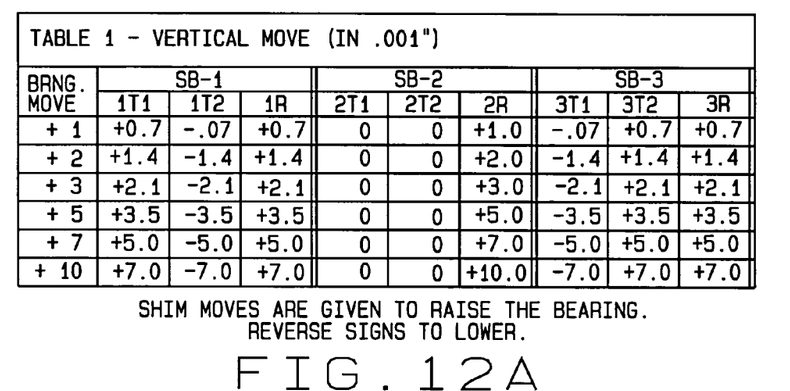
FIG. 12A is a table of values to accomplish representative vertical movement of the bearings.
Figure 12B:
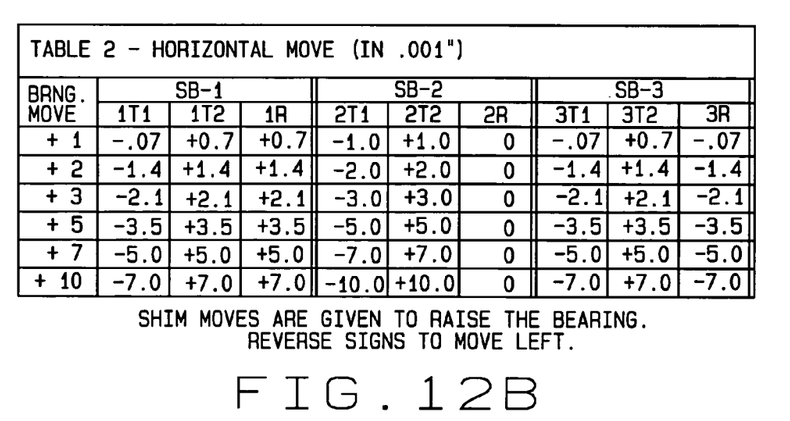
FIG. 12B is a table of values to accomplish representative horizontal movement of the bearing.

Another set of micrometer measurements can be made to assure that the pedestal plate is located correctly left/right and up/down, and has the correct tilt and twist, If not, the process of disassembly, machining and reassembly of the stub shaft, pedestal plate and shim plates must be performed. When the pedestal plate location is within a tolerance of approximately 0.020 inches (0.0508 mm), it can be secured, and the final alignment of the bearing can be achieved by adjusting the shims 176 of the saddle blocks according to the illustrative Tables of FIGS. 12A and 12B. The Tables 12A and 12B provide the shim moves required to obtain the specified vertical or horizontal movement of the bearing relative to the pedestal. It is to be noted that 80% or more contact between the saddle block and the saddle or bore 151 of the pedestal plate is desired, preferably with the contact in the center of the saddle block rather than on the edges. In the tables, the plus sign means adding shims and the minus sign, removing shims. The moves to all shims on the same line of the table should be made at the same time.

The invention claimed is:

1. The bearing stiff plate pedestal comprising a stiff plate with two mounting feet machined into the plate, one projecting transversely from either side of said plate, said feet seating onto a base of an outer pedestal housing to mount said stiff plate in approximately the same location from which an original spring plate pedestal was removed, said bearing stiff plate pedestal including a bearing with Babbitted tilting pads each tilting pad having a self-alignment feature to maintain alignment of the individual pads to the journal of a rotor being installed, said bearing having an upper half with ears spaced to provide gaps between a bottom surfaces of the ears and top surfaces of the stiff plate pedestal, with one or more shimmed saddle blocks that contact the cylindrical bore, and with flanges that have faces which extend outward beyond the cylindrical bore, and which have spaced contact with extending surfaces of the stiff plate pedestal, the space being on the order of 0.005 inches (0.127 mm) so as to locate the bearing axially relative to the stiff plate pedestal.

2. The bearing stiff plate pedestal of claim 1 wherein the stiff plate pedestal is made from carbon steel.

3. The bearing stiff plate pedestal of claim 2 wherein the stiff plate pedestal is made from forged carbon steel.

4. The bearing stiff plate pedestal of claim 2 wherein the stiff plate pedestal is made from forged alloy steel.

5. The bearing stiff plate pedestal of claim 4 wherein the forging is heat treated.

6. The bearing stiff plate pedestal of claim 2 wherein the stiff plate pedestal is made from cast carbon steel.

7. The bearing stiff plate of claim 2 wherein the stiff pedestal plate is stress relieved.

8. The bearing stiff plate pedestal of claim 2 including a bearing with ears, with holes in the ears aligned with threaded holes in the pedestal, and with bolts passing through the holes in the ears that are threaded into the holes in the pedestal to retain the bearing.

9. The bearing stiff plate pedestal of claim 8 including shims to fill gaps under the ears, leaving a remaining gap on the order of 0.002 inches (0.00508 mm) under each ear prior to tightening the bolts, and the bolts tightened to deflect elastically the ears until any remaining gap is gone and to assure that the bearing is retained in the stiff pedestal plate.

10. The bearing stiff plate pedestal of claim 1 wherein bolt holes are drilled through said feet in a predetermined pattern and used as templates to locate bolt holes in a floor plate of said outer pedestal housing to which the stiff plate is to be mounted, said bolt holes in said pedestal plate being then internally threaded.

11. The bearing stiff plate of claim 10 wherein mounting bolts are installed through said bolt holes in the mounting feet and are engaged in threaded holes in said floor plate of said outer pedestal housing.

12. The bearing stiff plate pedestal of claim 11 wherein the bolts are torqued to a prescribed torque value.

13. The bearing stiff plate pedestal of claim 1 including epoxy between said mounting surfaces and said base plate of said outer pedestal housing.

14. The bearing stiff plate pedestal of claim 1 including a semi-cylindrical saddle.

15. The bearing stiff plate pedestal of claim 14 including a face on each end of the saddle concentric to the saddle, each face extending in a plane radially outward from the saddle.

16. The bearing stiff plate pedestal of claim 15 including threaded bolt holes machined into the faces for retaining a bearing.

17. The bearing stiff plate pedestal of claim 1 including lubrication oil supply passageways extending to the saddle.

18. The bearing of claim 1 said bearing having shimable saddle blocks, in both radial and tangential directions, to provide accurate alignment moves, with shim adjustments on each saddle block calculated according to the mounting angles of the saddle blocks and angles of the shimable faces of the saddle blocks.

19. The bearing of claim 1 said tilting pad bearing having a floating ring seal at each end of the bearing.

20. The bearing of claim 1 having one or more drain ports in said top half.

21. The bearing of claim 1 wherein said tilting pads have ears, with gaps under the ears, and shims, of uniform or variable thickness, to fill the gaps under the ears except for leaving gaps on the order of 0.002 to 0.005 inches, and bolts passing through the ears that when torqued to specified torque for a particular application, the ears deflect to close the small gaps limiting the deflection and holding the bearing tightly in the pedestal bore.

* * * * *